(12) United States Patent
Lev

(10) Patent No.: US 12,267,628 B2
(45) Date of Patent: Apr. 1, 2025

(54) INTERACTIVE DIRECTION POINTING USING EMITTED DIRECTIONAL LIGHT FROM A HANDHELD DEVICE

(71) Applicant: NEC Corporation Of America, Herzlia (IL)

(72) Inventor: Tsvi Lev, Tel-Aviv (IL)

(73) Assignee: NEC Corporation Of America, Herzlia (IL)

( * ) Notice: Subject to any disclaimer, the term of this patent is extended or adjusted under 35 U.S.C. 154(b) by 65 days.

(21) Appl. No.: 18/208,328

(22) Filed: Jun. 12, 2023

(65) Prior Publication Data
US 2024/0414287 A1    Dec. 12, 2024

(51) Int. Cl.
| | |
|---|---|
| H04N 23/56 | (2023.01) |
| G06T 7/70 | (2017.01) |
| G08B 7/00 | (2006.01) |
| H04N 7/18 | (2006.01) |

(52) U.S. Cl.
CPC .............. *H04N 7/183* (2013.01); *G06T 7/70* (2017.01); *G08B 7/00* (2013.01); *H04N 23/56* (2023.01)

(58) Field of Classification Search
CPC .......... H04N 7/183; H04N 23/56; G06T 7/70; G08B 7/00
See application file for complete search history.

(56) References Cited

U.S. PATENT DOCUMENTS

| | | | | |
|---|---|---|---|---|
| 9,160,993 | B1* | 10/2015 | Lish | H04N 23/63 |
| 9,508,235 | B2* | 11/2016 | Suessemilch | G03B 21/20 |
| 2015/0310539 | A1* | 10/2015 | McCoy | G06Q 30/0639 |
| | | | | 705/27.1 |
| 2016/0188195 | A1* | 6/2016 | Chen | G06T 5/80 |
| | | | | 715/765 |
| 2019/0149722 | A1* | 5/2019 | Yen | G06F 3/04847 |
| | | | | 348/135 |
| 2021/0310642 | A1* | 10/2021 | Laliberte | H05B 47/196 |
| 2021/0310643 | A1* | 10/2021 | Laliberte | F21V 21/15 |
| 2022/0008588 | A1* | 1/2022 | Sood | G01J 5/0025 |
| 2022/0311924 | A1* | 9/2022 | Seo | G01J 1/0271 |
| 2023/0099570 | A1* | 3/2023 | Bobert | G06Q 10/0635 |
| | | | | 345/633 |
| 2024/0271938 | A1* | 8/2024 | Ren | G06N 3/044 |

\* cited by examiner

*Primary Examiner* — John R Schnurr

(57) ABSTRACT

A system includes a display and a camera module configured to capture forward real video and to output the forward real video on the display. A light source may be configured to generate light, and a navigation module may receive instructions regarding locating a target destination and may cause the light to be focused into a beam directed at the target destination as the user views both the forward real video and beam on the display. When the user reaches the desired location or orientation, the target destination is visibly illuminated by the beam of light.

13 Claims, 6 Drawing Sheets

INTERACTIVE DIRECTION POINTING USING EMITTED DIRECTIONAL LIGHT FROM A HANDHELD DEVICE

FIELD AND BACKGROUND OF THE INVENTION

The present invention, in some embodiments thereof, relates to navigational devices, and more particularly, to navigational devices that provide users with forward real video-based navigation services that include forward real video photographed by a camera for use in conjunction with position information, such as may be obtained from a global positioning system (GPS) receiver.

Applications running on handheld devices may use graphics or audio to point to or otherwise encourage the holder to move in the direction of an object in real space. For example, a navigational application may display a map with a superimposed arrow pointing in the direction of a destination. In another example, a handheld device may audibly instruct a user where to move in order to locate an object on which some operation is to be performed (e.g., moving, opening, collecting). Still another example may include an application that displays superimposed text that directs the user to a place where an object should be relocated.

Some such applications comprise augmented reality technologies that describe a location or direction using text or audio. While augmented reality (AR) applications facilitate useful navigational possibilities, such systems typically require the user to inconveniently wear AR glasses or a virtual reality helmet with pass-through capabilities. Other implementations require the user to constantly compare information displayed on a screen to their actual surroundings while moving and otherwise manipulating a device.

SUMMARY OF THE INVENTION

According to an aspect of some embodiments of the present invention there is provided an apparatus comprising a display and a camera module configured to capture forward real video and to output the forward real video on the display. A light source may be configured to generate light, and a navigation module may receive instructions that regard locating a target destination and cause the light to be focused into a beam directed at the target destination as the user views the forward real video and the beam of light on the display. When the user reaches the desired location or orientation, the target destination is visibly illuminated by the beam of light.

According to some embodiments of the invention, the light source includes a beam concentrator configured to concentrate emitted light. The beam concentrator is attached to a camera flash module.

According to some embodiments of the invention, the beam flashes. The beam may change color based on a proximity to the target destination.

According to some embodiments of the invention, a satellite-based radio-navigation system receiver receives current position information from a satellite. A speaker may be configured to audibly alert a user based on a position of the user. A vibrating module may be configured to vibrate to alert a user based on a position of the user.

According to other aspects of some embodiments of the present invention, there is provided an apparatus that includes a beam directional component configured to direct a beam of light, and a satellite-based radio-navigation system receiver, as well as a processor in communication with the satellite-based radio-navigation system receiver and the beam directional component, the processor configured to cause the beam directional component to direct the beam of light towards a target destination based on received satellite-based radio-navigation system data as the user views forward real video on a handheld display.

According to some embodiments of the invention, the processor is further configured to perform dead reckoning processes that include incorporating estimates of speed and direction. In another or the same embodiment, the satellite-based radio-navigation system receiver is a global positioning system (GPS) receiver.

According to some embodiments of the invention, the processor is configured to cause the beam of light to flash according to a proximity to the target destination. A processor of another or the same embodiment is configured to cause the beam of light to change color.

According to other aspects of some embodiments of the present invention, there is provided a non-transitory computer-readable medium comprising instructions that, in response to execution of the instructions by one or more processors, cause the one or more processors to perform the following operations: receive satellite-based radio-navigation system data; receive forward real video from a camera module; cause a beam directional component to direct a beam of light towards a target destination based on the satellite-based radio-navigation system data; and initiate a display of the forward real video on a handheld display such that the target destination is visibly illuminated by the beam of light as the user views the handheld display.

According to some embodiments of the invention, the one or more processors are further configured to cause the beam to light to be directed in a direction towards the target destination within the handheld display to urge the user to move the handheld display in the direction until the target destination is visible within the handheld display.

According to some embodiments of the invention, the one or more processors are further configured to initiate a vibration to alert a user based on a position of the user. According to another or the same embodiment, the one or more processors are further configured to initiate a vibration to alert a user based on a position of the user. According to another or the same embodiment, the one or more processors are further configured to perform dead reckoning processes that include incorporating estimates of speed and direction Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

The present invention, in some embodiments thereof, relates to navigational devices, and more particularly, to navigational devices that provide users with forward real video-based navigation services that include forward real video photographed by a camera for use in conjunction with position information, such as may be obtained from a global positioning system (GPS) receiver.

An implementation may include a mobile handheld device that includes a camera, as well as a light source configured to emit a narrow angle beam of light. The system may capture live images of a user's surrounding and detect in them a relative location of a desired direction or object. An embodiment of the system may provide the user with audio, visual, and vibrational cues on how to move the handheld device in a direction towards a pre-planned location or orientation, and ultimately towards the target destination (e.g., location, point, or object).

A specific implementation of the system may shine a directional light such that the light hits the physical world at the desired orientation target destination. The light may optionally be modulated. For instance, the light may flash, and the frequency of the flashing may change as the user gets nearer to or farther from the target destination. In another example, the light may change in intensity and color. The handheld device may additionally vibrate or emit a sound depending on the position of the handheld device relative to the target destination. For purposes of this description, a target destination may be a location, object, a point, or a position.

In one example, a handheld device (e.g., a smartphone) may have a phone camera in addition to sensors comprising the position sensing platform. The flash module of the phone may generate the modulated, directional light beam. To this end, a beam concentrator may optionally be attached to the flash module to turn the phone flash into a directional beam. In this manner, the smartphone flash and beam condenser may be used to aim the beam at a specific spot.

In another or the same embodiment, the system may obtain accurate current position information through calibration using a speed sensor, a gyroscope, and a user's set destination point information. The system may locate the target destination based at least in part on a relative position of an object captured in the forward read video. For instance, a navigational module may use image recognition to determine that a known type of object or landmark is captured in the view of the camera. The position of the target destination may be known or determined using the captured imaged and estimated location of the object relative to the target destination. The beam illuminating the target destination point may be visible on the screen displaying the forward real video. The system may use feedback from image as to where to move the light or how to apply it (e.g., flashing and color changes).

Figure 1:
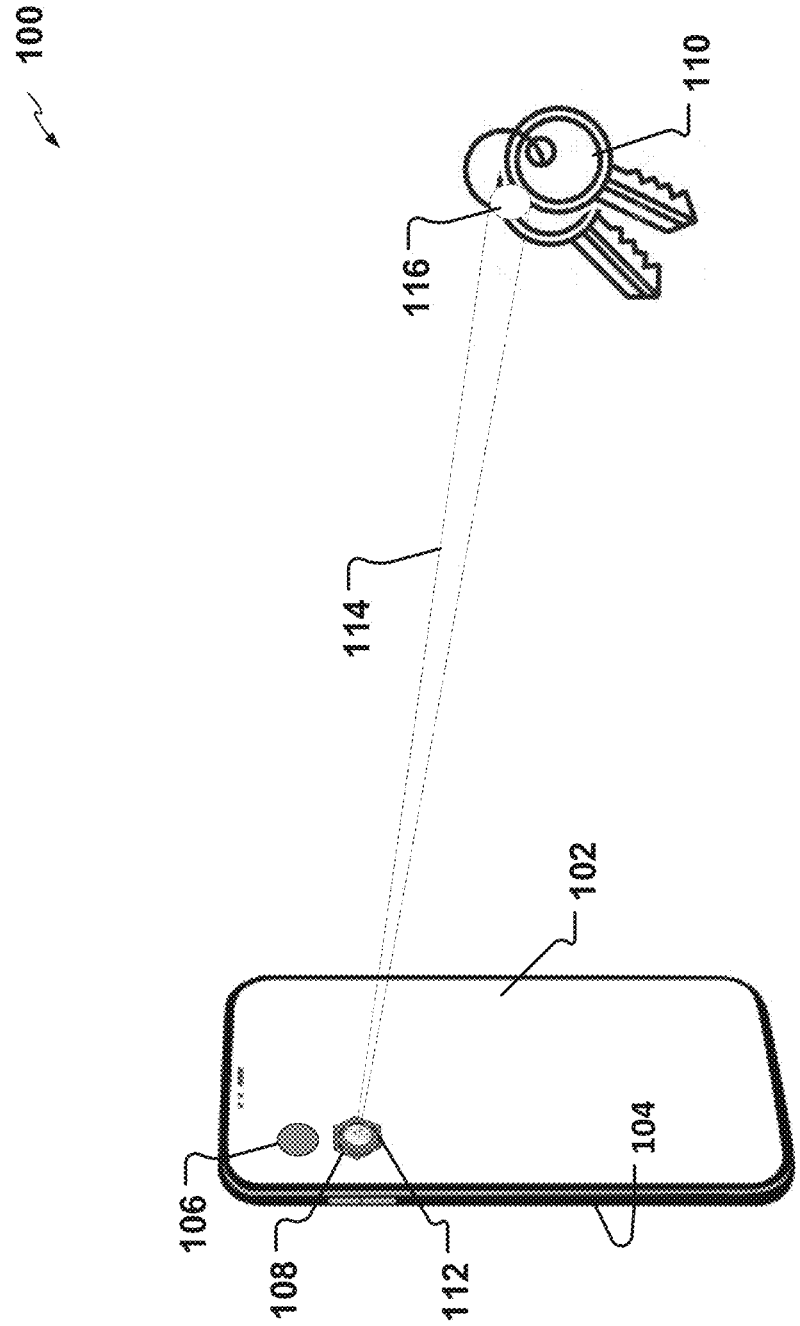
FIG. 1 is a system perspective view illustrating a system, which includes a handheld device comprising a display and a camera module configured to capture and output the forward real video on the display, along with a beam of light illuminating a target destination.

FIG. 1 is a system perspective view illustrating a system 100, or apparatus, which includes handheld device 102 comprising a display 104 and a camera module 106 configured to capture and output the forward real video on the display 104. A light source 108 may be configured to generate light, and a navigation module (i.e., comprising circuitry and software internal to the handheld device 102) may receive instructions regarding locating a target destination 110. The navigation module, optionally in combination with a beam concentrator 112, may cause the light to be focused into a beam 114 directed towards the target destination 110. When the user reaches the desired location or orientation, the target destination 110 may be visibly illuminated at point 116 by the beam of light 114 as the user views the forward real video on the display 104.

Systems may take many forms that include (in addition to the illustrated smartphone) boots, belts, and watches, among other devices to handle different carrying scenarios and movements, as well as hardware differences across personal digital assistant (PDA) models.

Figure 2:
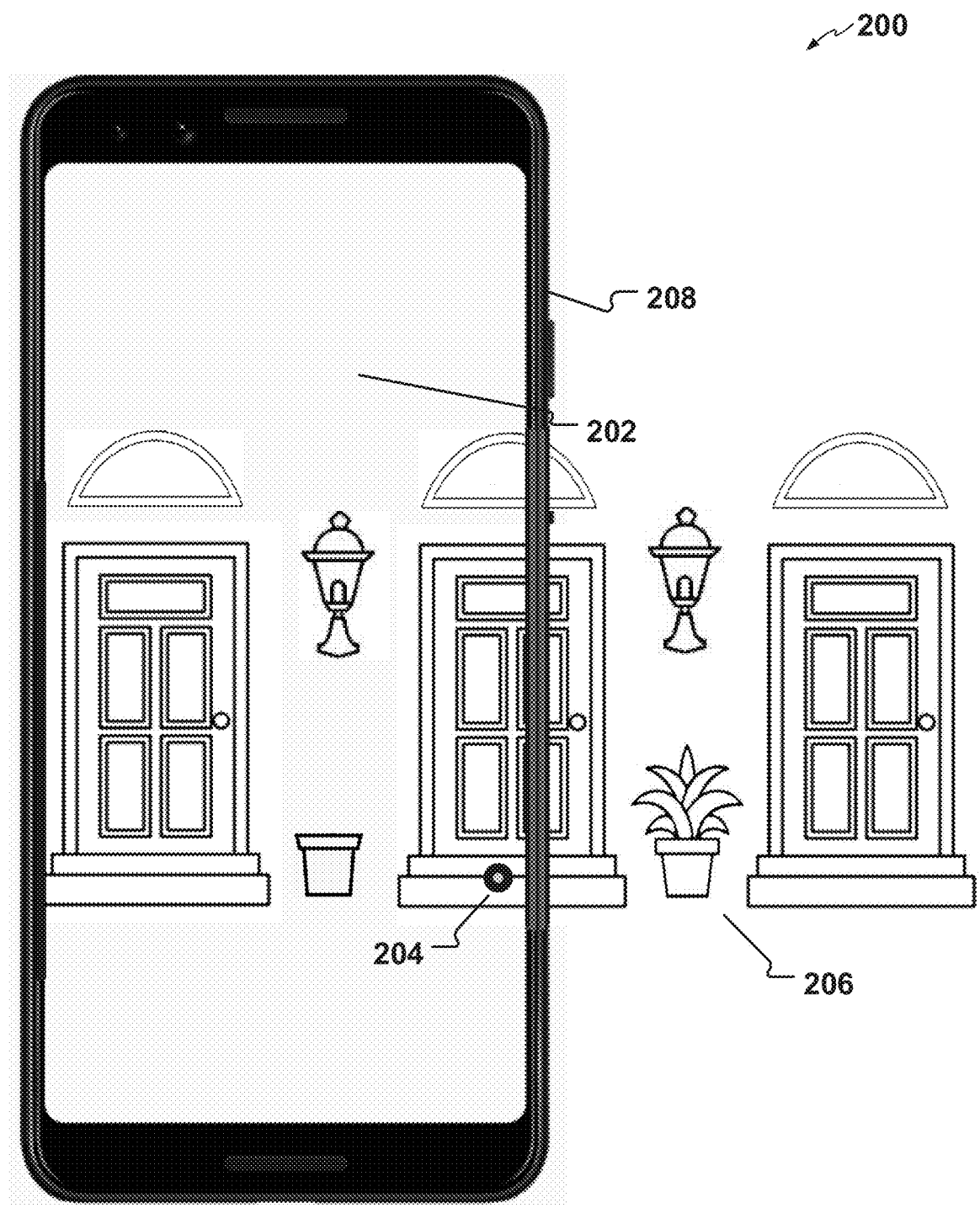
FIG. 2 illustrates an environment that includes an embodiment of the system comprising a display of a smartphone from the perspective of a user viewing real time forward video with a focal point of a concentrated beam of light emitted from the smartphone that is visible in a location on the display in the direction of a target destination.

FIG. 2 illustrates an environment 200 that includes an embodiment of the system comprising a display 202 of a smartphone 208 from the perspective of a user viewing real time forward video. A focal point 204 of a concentrated beam of light emitted from the smartphone 208 is visible in a location on the display 202 in the direction of a target destination 206. The beam of the focal point 204 may be targeted at a farthest point viewable on the display 202 in the direction of the target destination 206 to urge the holder of the smartphone 208 in that direction.

Depending on its proximity from the target destination 206, the focal point 204 of an embodiment of the system 200 may move rapidly in quick succession to create a vibrating effect. The focal point 204 of another embodiment of the system 200 may spin in tight circles, or change in color and/or shape. Such effects may be initiated in one implementation as a user gets closer to the target destination 206. For instance, the focal point 204 may be green in color as a user heads in the direction of the target destination 206, but may change to red when a user heads in a direction away from the target destination 206.

Figure 3:
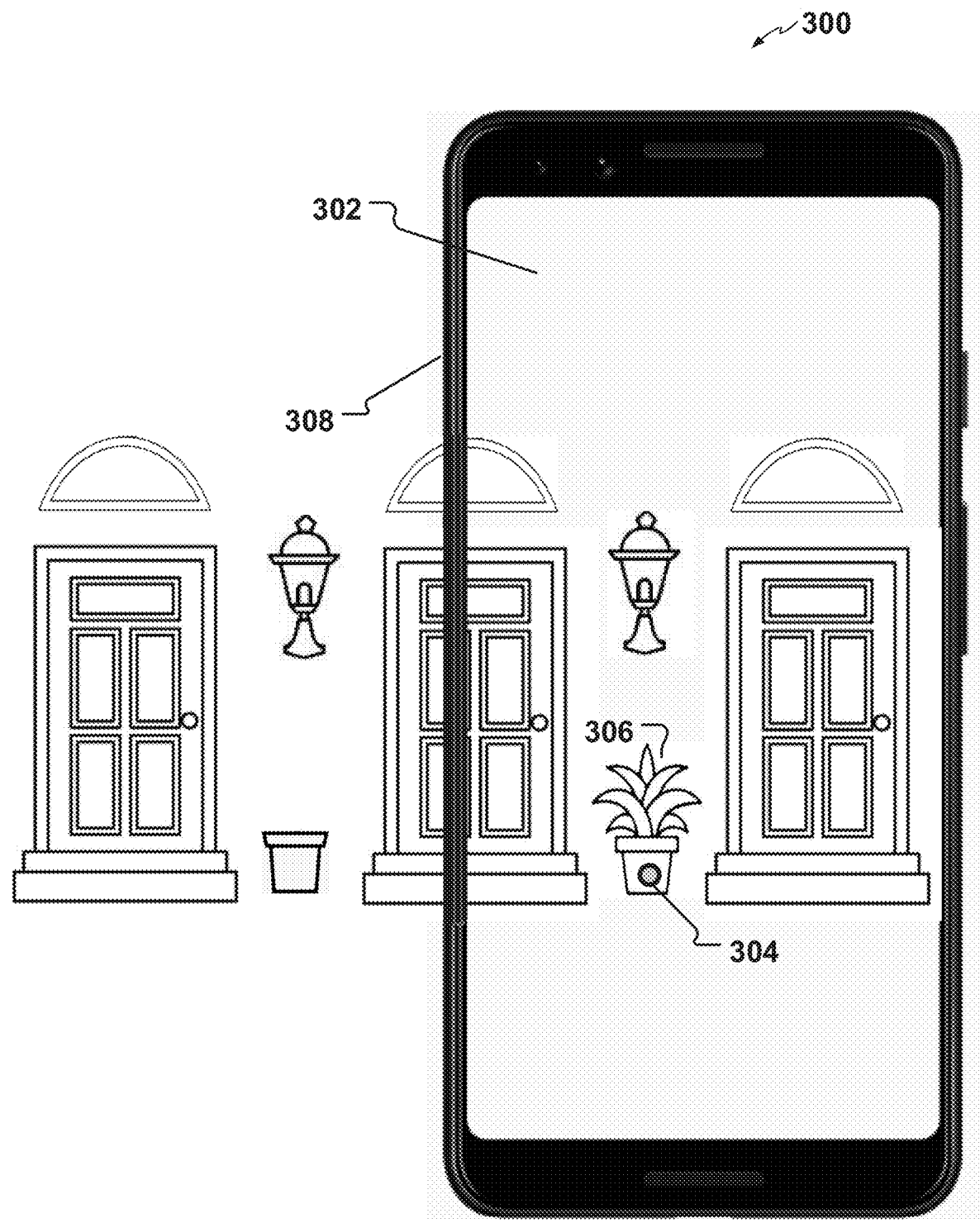
FIG. 3 illustrates an environment, identical to that shown in FIG. 2, that includes an embodiment of the system comprising a display of a smartphone from the perspective of a user viewing real time forward video.

FIG. 3 illustrates an environment 300, similar to that shown in FIG. 2, which includes an embodiment of the system comprising a display 302 of a smartphone 308 from the perspective of a user viewing real time forward video. The smartphone 308 may be the same as the smartphone 208 of FIG. 2. A focal point 304 of a concentrated beam of light emitted from the smartphone 308 is visible in a location on the display 302 illuminating a target destination 306.

The focal point 304 of the beam may remain on the target destination 306. For example, the focal point 304 of the beam may remain centered on the target destination as the user moves the perspective of the livestream forward video presented on the display 302.

The focal point 304 of an embodiment of the system may flash off and on rapidly in quick succession to create a vibrating effect when it reaches the target destination 306. The focal point 304 of another embodiment of the system may move rapidly in quick succession to create a vibrating effect when it reaches the target destination 306. The focal point 304 of another embodiment of the system may spin in tight circles, or change in color and/or shape. Such effects may be initiated in one implementation as a user arrives at the target destination 306. For instance, the focal point 204 may turn green when pointing to the target destination 206.

Figure 4:
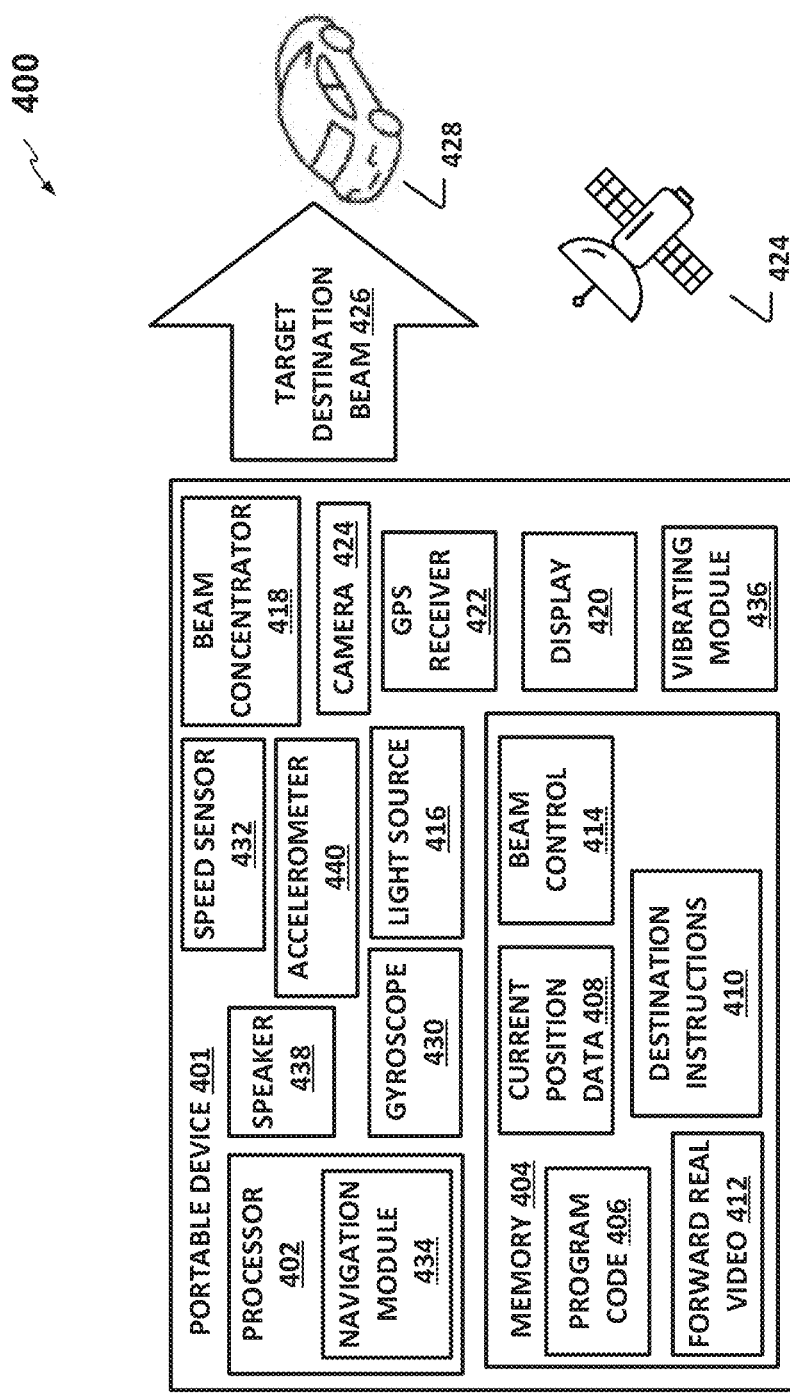
FIG. 4 is a block diagram of an embodiment of a system configured to display forward real video along with a focused beam of light positioned in a direction towards a target destination.

FIG. 4 is a block diagram of an embodiment of a system 400 configured to display forward real video 412 along with a focused beam of light 426 positioned in a direction towards a target destination 428. The system 400 includes a display 420 and a processor 402. A light source 416, such as a smartphone flash module, may generate light. In some embodiments, the light may be focused by a beam concentrator 418.

A navigation module 434 may be executed by the processor 402 to receive destination instructions 410 regarding locating the target destination 428 and may cause the light to be focused into the beam 426 directed at the target destination 428 such that the target destination 428 is visibly illuminated by the beam 426 of light as the user views the forward real video 412 on the display 420. To this end, the navigation module 434 may access current position data 408. The current position data 408 may be acquired using position determination technologies, such as a GPS receiver 422 and corresponding satellite 424. The GPS receiver 422 receives electromagnetic wave transmitted from the known satellite 424, and obtains the position of an observation point from measured data of a time required until the electromagnetic wave reaches the observation point.

In one implementation, a GPS receiver receives the current position data 408 (e.g., of a vehicle or a pedestrian) during travel. The processor 402 in a particular embodiment may dead reckon, reconcile or otherwise correlate the position information of the GPS receiver 422 with other current position data 408 and the target destination instructions 410 to determine the relative location of the target destination 428. The display 420 may display the current forward live video 412 along with route information that may include the focused beam of light 426.

According to a particular implementation, the navigation module 434 may perform dead reckoning, map matching, and GPS functions. In one example, the dead reckoning obtains the trip trajectory and relative position of the device 401 using a bearing sensor and a distance sensor. The navigation module 434 may compare the trip trajectory obtained by dead reckoning with map data to determine a position of the device 401.

In another or the same example, a controller may perform dead reckoning processes that include calculating a current position of a person using a previously determined position, or fix, and then may incorporate estimates of speed, heading direction, and course over elapsed time. For instance, the system 400 may obtain accurate current position data 408 through calibration using a speed sensor 432, a gyroscope 430, and the target destination instructions 410. The target destination instructions 410 may include positional information relating to the target destination. In one example, the positional information may include latitudinal and longitudinal data. In another or the same embodiment, the instructions 410 may include a relative position of an object captured in the forward read video. For instance, a navigational module 434 may use image recognition to determine that a known type of object or landmark is captured in the view of the camera. In an implementation, the system 400 may use artificial intelligence and machine learning techniques to recognize images of objects. In one example, the navigational module may use GPS data in conjunction with a known landmark to direct a user. Continuing with the above example, system 400 may recognize that building and adjust the determined position of a user. In another example, the system may receive instructions indicating that a document is positioned on a rear, righthand driver side seat of an automobile. In such a scenario, the system may recognize the image of the automobile and determine an estimated position of the target document based on the relative orientation of the automobile. For instance, the system 400 may acquire and identify doors of the automobile (e.g., a rear passenger door) and guide the user accordingly. The position of the target destination may thus be known or determined using the captured imaged and estimated location of the object relative to the target destination. The beam illuminating the target destination point may be visible on the screen displaying the forward real video The beam 426 illuminating the target destination 428 may be visible on the screen 420 displaying the forward real video 412.

Where so configured in the sensor offerings of a smartphone or other handheld device 401, a built-in accelerometer 440 can be used as a pedometer and built-in magnetometer as a compass heading provider. Pedestrian dead reckoning (PDR) can be used to supplement and complement other navigation methods. According to an embodiment of the system 400, a user may hold their phone in front of them and each step may cause their position to move forward a fixed distance in a direction measured by a compass. Sensor precision may account for magnetic disturbances inside structures, and unknown variables such as carrying position and stride length. The processes may differentiate between walking from running, and recognize movements like bicycling, climbing stairs, or riding an elevator. In one or more particular embodiments, a pedometer may be used to measure linear distance traveled, and PDR systems have an embedded magnetometer for heading measurement.

A memory 404 of the device 401 may store program code 406, as well as a light beam control module 414 configured to manipulate the beam concentrator 418 to focus and direct the target destination beam 426.

In addition to the light source 416, the handheld or otherwise portable device 401 may include a camera 424 and a speaker 438. The camera 424 may capture the forward real video 412. In some embodiments, the speaker 438 may generate audio instructing the holder of the device 401 regarding their movements and location. A vibrating module 436 may vibrate depending on the location of the device holder to alert the user.

Figure 5:
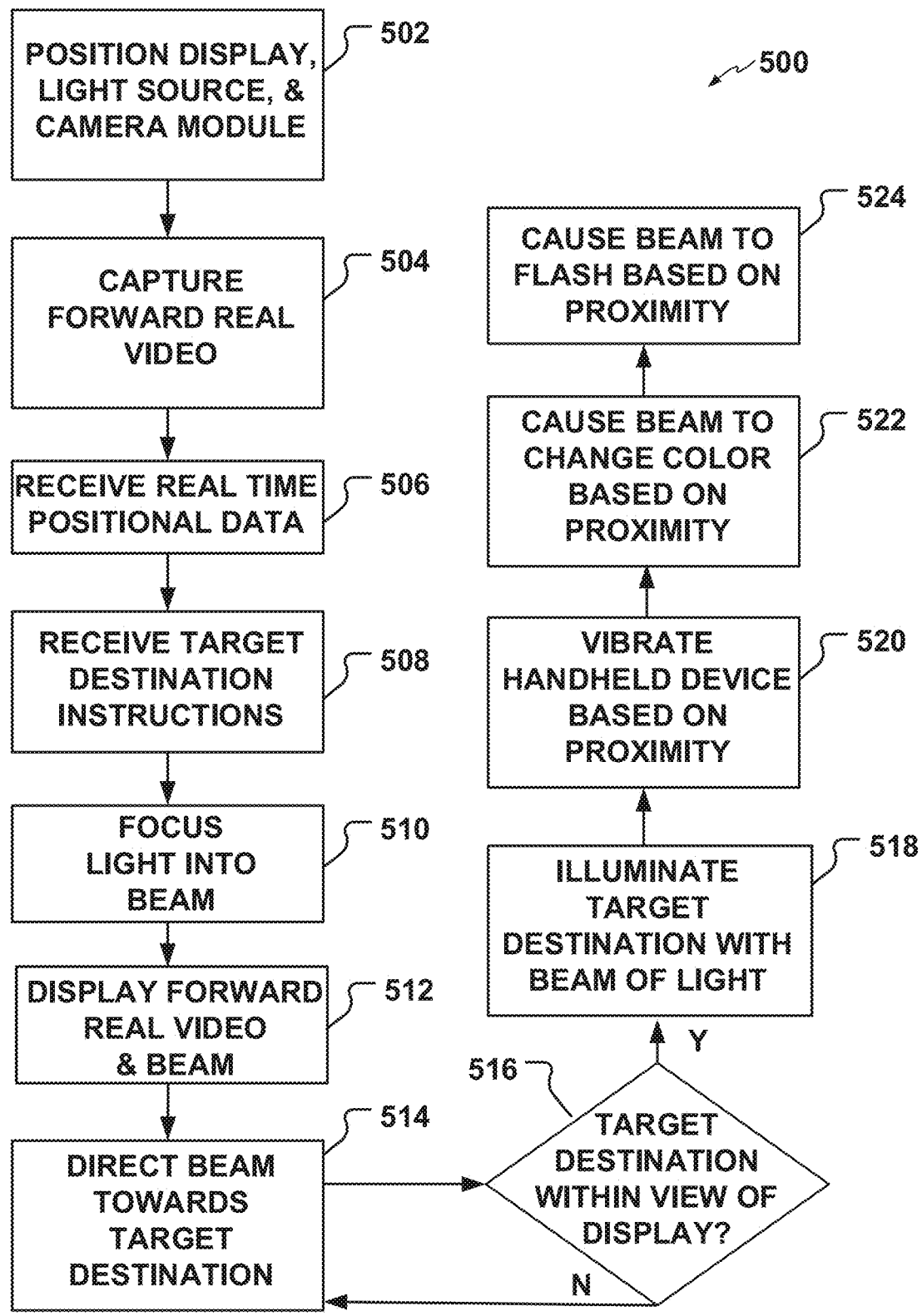
FIG. 5 is a flowchart of an embodiment of a method to display forward real video along with a focused beam of light positioned in a direction towards a target destination.

FIG. 5 is a flowchart of an embodiment of a method 500 to display forward real video along with a focused beam of light positioned in a direction towards a target destination. Turning particularly to the flowchart, a display, light source, and camera module may be positioned at 502 within a portable device. The display in one implementation may be the display of a smartphone. A light source may comprise a flash module of a phone, such is used for photography. However, a light source of another embodiment may include a light dedicated to illuminating the target destination. The camera module may be similar to the camera module 106 of FIG. 1. The camera module described in 502 may be used to capture forward real video at 504.

At 506, the method 500 may include receiving real time positional data. For instance, the system may receive information relating to the current position of the handheld device. Such target destination instructions may be similar to the current position data 408 of the embodiment of the system 400 of FIG. 4.

Target destination instructions may be received at 508. Such target destination instructions may be similar to the target destination instructions 410 of the embodiment of the system 400 of FIG. 4.

At 510, the method 500 may include focusing the light from the light source into a beam. To this end, an implementation may include a beam concentrator, such as the beam concentrator 112 of the system 100 of FIG. 1. An illustrative beam concentrator may comprise an aftermarket type device or maybe original equipment manufactured as a component of a light source.

The forward real video captured at 504 may be viewable on the display at 512, along with the focused beam of light of 510. For example, FIG. 2 shows a system 200 having a display 202 showing the environment viewed by the camera of a handheld device 208. A focused beam 204 is concurrently viewable on the display 202.

At 514, the method 500 may include directing the beam of light in a direction towards the target destination. As shown in FIG. 2, the beam of the focal point 204 may be focused at a farthest point viewable on the display 202 in the target destination direction to urge the holder of the smartphone towards the target destination.

The method 500 at 516 may determine if the target destination is within the viewable range of the display. That is, the target destination may be visible in a location on the display.

If the target destination is not within visible in a location of the display at 516, then the method 500 may loop back to 514 until the target destination is viewable on the display.

Where the target destination is alternatively within visible in a location of the display at 516, the method 500 may at 518 illuminate the target destination with the beam of light. The focal point of the beam may remain centered on the target destination as the user moves the perspective of the livestream forward video that is presented on the display.

Where so configured, the method 500 may include causing the smartphone or other handheld device to vibrate at 520. For instance, the vibrating module 436 of the system 400 of FIG. 4 may cause the device to vibrate in the hand of the user based on the beam illuminating the target destination, or based on some other proximity of the handheld device relative to the target destination.

At 522, the method 500 may modulate the beam of light. For instance, the system may cause the focal point of the beam of light to appear to change color on the display based on the beam illuminating the target destination, or based on some other proximity of the handheld device relative to the target destination. In one embodiment, the beam of light, itself, may change color at the light source. In another implementation, the color of the focal point of the beam of light may be altered digitally on the display. For instance, the focal point may be green in color as a user heads in the direction of the target destination, but may change to red when a user heads in a direction away from the target destination.

At 524, the method 500 may additionally or alternatively modulate the beam of light by causing the focal point of the beam of light to appear to flash on the display based on the beam illuminating the target destination, or based on some other proximity of the handheld device relative to the target destination. In one embodiment, the beam of light, itself, may flash at the light source. In another implementation, the light may be altered digitally on the display.

Figure 6:
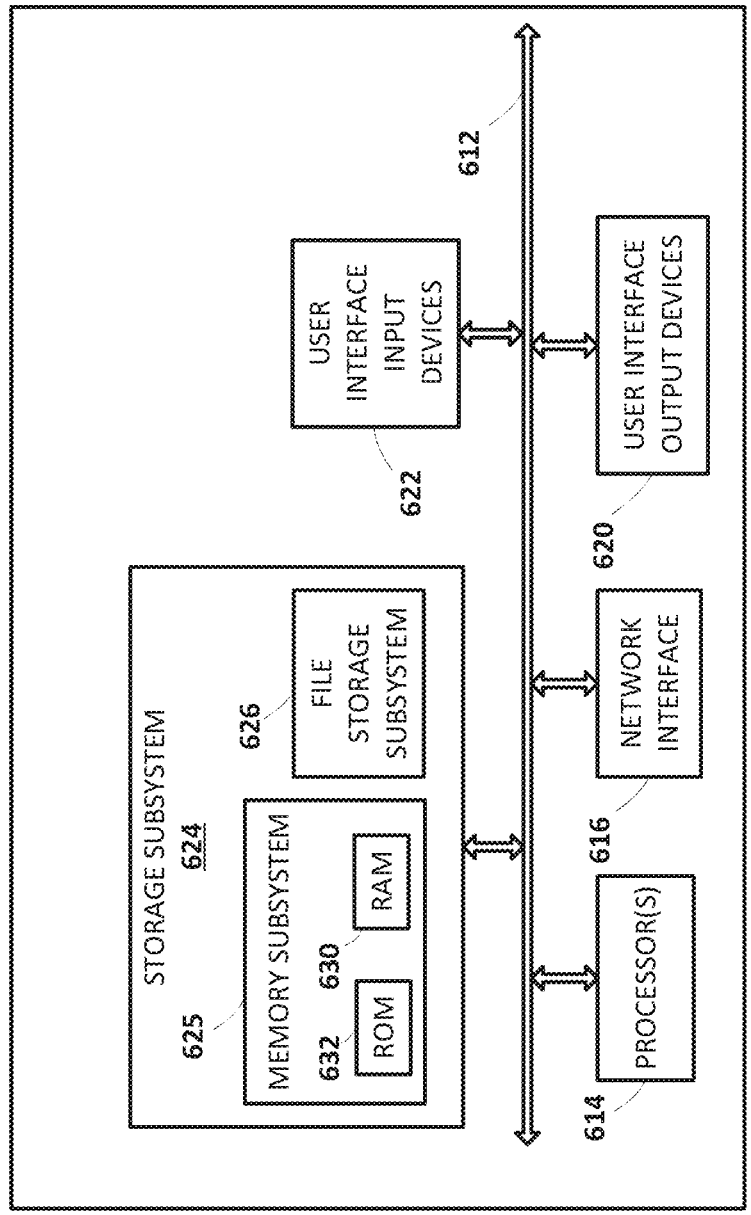
FIG. 6 illustrates an example architecture of a computing device, and more particularly, a block diagram of a system that may optionally be utilized to perform one or more aspects of techniques described herein.

FIG. 6 is a block diagram of an example computing device 600 that may optionally be utilized to perform one or more aspects of techniques described herein. In some implementations, one or more of a client computing device, user-controlled resources engine, and/or other component(s) may comprise one or more components of the example computing device 600.

Computing device 600 typically includes at least one processor 614 that communicates with several peripheral devices via bus subsystem 612. These peripheral devices may include a storage subsystem 624 that includes, for example, a memory subsystem 625 and a file storage subsystem 626, as well as a user interface output devices 620, user interface input devices 622, and a network interface subsystem 616. The user interface input devices 622 of an implementation may include a response volume setting, among other features. The input and output devices allow user interaction with computing device 600. The network interface subsystem 616 provides an interface to outside networks and is coupled to corresponding interface devices in other computing devices.

The user interface input devices 622 may include a keyboard, pointing devices such as a mouse, trackball, touchpad, or graphics tablet, a scanner, a touch screen incorporated into the display, audio input devices such as voice recognition systems, microphones, and/or other types of input devices. In general, use of the term "input device" is intended to include all possible types of devices and ways to input information into computing device 600 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term output device is intended to include all possible types of devices and ways to output information from computing device 600 to the user or to another machine or computing device.

The storage subsystem 624 stores programming and data constructs that provide the functionality of some or all the modules described herein. For example, the storage subsystem 624 may include the logic to perform selected aspects of the method and to implement various components depicted in the preceding figures.

These software modules are generally executed by processor 614 alone or in combination with other processors. The memory subsystem 625 used in the storage subsystem 624 may include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

The bus subsystem 612 provides a mechanism for letting the various components and subsystems of computing device 600 communicate with each other as intended. Although the bus subsystem 612 is shown schematically as a single bus, alternative implementations of the bus subsystem may use multiple busses.

The computing device 600 can be of varying types including a workstation, server, computing cluster, blade server, server farm, or any other data processing system or computing device. Due to the ever-changing nature of computers and networks, the description of computing device 600 depicted in FIG. 6 is intended only as a specific example for purposes of illustrating some implementations. Many other configurations of computing device 600 are possible having more or fewer components than the computing device depicted in FIG. 6.

The terms "comprises", "comprising", "includes", "including", "having" and their conjugates mean "including but not limited to". The term "consisting of" means "including and limited to". The term "consisting essentially of" means that the composition, method, or structure may include additional ingredients, steps and/or parts, but only if the additional ingredients, steps and/or parts do not materially alter the basic and novel characteristics of the claimed composition, method, or structure. As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications, and variations will be apparent to those skilled in the art. Accordingly, it is intended to embrace all such alternatives, modifications and variations that fall within the spirit and broad scope of the appended claims.

It is the intent of the Applicant(s) that all publications, patents, and patent applications referred to in this specification are to be incorporated in their entirety by reference into the specification, as if each individual publication, patent, or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. An apparatus comprising:
   a display;
   a camera configured to capture and output forward real video onto the display;
   a light source configured to generate light; and
   a circuitry configured to:
      receive instructions regarding locating a target destination; and
      cause the light to be focused into a beam directed towards the target destination as the user views the forward real video and the beam light on the display;
   wherein the beam changes color based on a proximity to the target destination.

2. The apparatus of claim 1, wherein the circuitry locates the target destination based at least in part on a relative position of an object captured in the forward read video.

3. The apparatus of claim 1, wherein the target destination is visibly illuminated by the beam of light.

4. The apparatus of claim 1, wherein the light source includes a beam concentrator configured to concentrate emitted light.

5. The apparatus of claim 3, wherein a beam concentrator is attached to a camera flash module.

6. The apparatus of claim 1, wherein the circuitry is further configured to visually acquire the target destination using at least one of: image recognition, gyro, a speed sensor, or satellite-based radio-navigation system data.

7. The apparatus of claim 1, further comprising a satellite-based radio-navigation system receiver that receives current position information from a satellite-based radio-navigation system receiver.

8. The apparatus of claim 1, wherein the beam flashes.

9. The apparatus of claim 1, further comprising a speaker configured to audibly alert a user based on a position of the user.

10. The apparatus of claim 1, further comprising a vibrating module configured to vibrate to alert a user based on a position of the user.

11. A non-transitory computer-readable medium comprising instructions that, in response to execution of the instructions by one or more processors, cause the one or more processors to perform the following operations:
receive satellite-based radio-navigation system data;
receive forward real video from a camera;
cause a beam directional component to direct a beam of light towards a target destination based on the satellite-based radio-navigation system data; and
initiate a display of the forward real video on a handheld display and the beam of light as the user views the handheld display;
wherein the one or more processors are further configured to cause the beam of light to be directed in a direction towards the target destination within the handheld display to urge the user to move the handheld display in the direction until the target destination is visible within the handheld display.

12. The non-transitory computer-readable medium of claim 11, wherein the one or more processors are further configured to cause a speaker to audibly alert a user based on a position of the user.

13. The non-transitory computer-readable medium of claim 11, wherein the one or more processors are further configured to locate the target destination based at least in part on a relative position of an object captured in the forward read video.

* * * * *